(12) United States Patent
Ventallo et al.

(10) Patent No.: US 11,578,800 B2
(45) Date of Patent: Feb. 14, 2023

(54) SEALING PLUGS

(71) Applicant: ILLINOIS TOOL WORKS INC., Glenview, IL (US)

(72) Inventors: Josep Ventallo, Barcelona (ES); Francisco Cuervas, Barcelona (ES); Javier Arteta, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 183 days.

(21) Appl. No.: 16/881,386

(22) Filed: May 22, 2020

(65) Prior Publication Data
US 2020/0386314 A1    Dec. 10, 2020

(30) Foreign Application Priority Data

Jun. 5, 2019 (EP) ..................................... 19382461
Apr. 14, 2020 (EP) ..................................... 20382292

(51) Int. Cl.
| | |
|---|---|
| *F16J 15/10* | (2006.01) |
| *B60J 10/15* | (2016.01) |
| *B60J 10/23* | (2016.01) |
| *B60J 10/24* | (2016.01) |
| *B60J 10/26* | (2016.01) |
| *B62D 25/24* | (2006.01) |
| *F16J 15/06* | (2006.01) |

(52) U.S. Cl.
CPC ............. *F16J 15/104* (2013.01); *B60J 10/15* (2016.02); *B60J 10/23* (2016.02); *B60J 10/24* (2016.02); *B60J 10/26* (2016.02); *B62D 25/24* (2013.01); *F16J 15/062* (2013.01)

(58) Field of Classification Search
CPC ........ F16J 15/062; F16J 15/104; B62D 25/24; B60J 10/26; B60J 10/24; B60J 10/23; B60J 10/15
See application file for complete search history.

(56) References Cited

U.S. PATENT DOCUMENTS 3,021,975 A * 2/1962 Sarafinas ............... B65D 39/00
                                                220/789
3,991,446 A * 11/1976 Mooney ............... H02G 3/0616
                                                411/548

(Continued)

FOREIGN PATENT DOCUMENTS

| | | |
|---|---|---|
| DE | 10303366 | 8/2004 |
| EP | 0911132 | 10/1998 |

(Continued)

*Primary Examiner* — Eugene G Byrd
(74) *Attorney, Agent, or Firm* — Thompson Hine LLP

(57) ABSTRACT

A sealing plug (100) for a panel opening, the plug having an axis (132) and including a head portion (110) having a first diameter larger than of the panel opening and a leg portion (120) concentric to the head portion (110) and having a second diameter shorter than the first diameter, the leg includes at least two latches (130) extending radially towards the head portion (110), and wherein the passing of the leg portion (120) and the at least two latches (130) through the panel opening causes resilient deformation of each latch (130), such that each latch (130) deforms and recovers thereby causing the panel to be retained by the at least two latches (130) and between the at least two latches (130) and the head portion (110) of the plug (100).

13 Claims, 4 Drawing Sheets

(56) References Cited

U.S. PATENT DOCUMENTS

| | | | | |
|---|---|---|---|---|
| 4,760,935 | A * | 8/1988 | van den Beld | B60R 13/06 |
| | | | | 220/789 |
| 4,801,040 | A * | 1/1989 | Kraus | B62D 25/24 |
| | | | | 220/787 |
| 4,885,121 | A | 12/1989 | Patel | |
| 4,938,378 | A * | 7/1990 | Kraus | B62D 25/24 |
| | | | | 220/789 |
| 5,709,309 | A * | 1/1998 | Gallagher | B62D 25/24 |
| | | | | 137/849 |
| 6,319,436 | B1 * | 11/2001 | Jaeger | B29C 44/0461 |
| | | | | 264/255 |
| 6,708,979 | B2 * | 3/2004 | Stratman | B62D 25/24 |
| | | | | 220/359.4 |
| 8,070,008 | B2 * | 12/2011 | Janke | B62D 25/24 |
| | | | | 220/233 |
| 8,162,166 | B2 * | 4/2012 | Nakazato | B62D 25/24 |
| | | | | 220/359.4 |
| 9,120,509 | B2 * | 9/2015 | Iwahara | B62D 25/24 |
| 9,676,425 | B2 | 6/2017 | Kanie | |
| 9,714,055 | B2 * | 7/2017 | Shimada | B62D 25/24 |
| 2005/0206094 | A1 * | 9/2005 | Kraus | B65D 39/0041 |
| | | | | 277/628 |
| 2006/0186130 | A1 * | 8/2006 | Jatzke | B62D 25/24 |
| | | | | 220/789 |
| 2013/0014444 | A1 * | 1/2013 | Siragusa | B62D 25/24 |
| | | | | 49/501 |
| 2014/0125081 | A1 * | 5/2014 | Pares Isanta | B62D 25/24 |
| | | | | 296/1.06 |
| 2015/0135598 | A1 * | 5/2015 | Jatzke | B62D 25/24 |
| | | | | 49/463 |
| 2016/0244104 | A1 * | 8/2016 | Kuhm | B62D 25/24 |
| 2017/0152948 | A1 * | 6/2017 | Huebner | F16J 13/14 |
| 2019/0308671 | A1 | 10/2019 | Kuhm | |
| 2021/0048105 | A1 * | 2/2021 | Wang | B62D 25/24 |

FOREIGN PATENT DOCUMENTS

| | | | |
|---|---|---|---|
| EP | 3061675 | 8/2016 | |
| JP | 61059067 A * | 3/1986 | B62D 25/24 |
| WO | WO 2009/133487 A1 | 11/2009 | |
| WO | WO 2012/157614 A1 | 11/2012 | |

\* cited by examiner

A-A

SEALING PLUGS

OBJECT OF THE INVENTION

The present invention refers to sealing plugs with improved retaining latches that reduce the insertion force of the sealing plug.

BACKGROUND OF THE INVENTION

To prevent the penetration of dirt or water during the production of motor vehicles, it may be necessary to seal openings in motor vehicle components. Sealing plugs are used for this purpose and can be inserted into an opening in a vehicle body part as e.g. a body panel of the vehicle.

An insertion force or push-in force must be applied onto a head portion of the plug during the insertion of the plug into the opening in the vehicle body part. This insertion force demands energy consumption and increases plug installation complexity. Due to new requirements from customers, low insertion force plugs are demanded.

Hence, there is a need to develop plug designs that reduce the insertion force of the plug and thus, eases plug insertion. In this regard, the present invention to solves at least this drawback.

DESCRIPTION OF THE INVENTION

The present invention relates to sealing plugs for vehicle body parts applied to all areas of the vehicle body. The proposed sealing plugs comprise improved retaining latches that retain vehicle body parts and contribute to the sealing function of the plug.

In a first aspect, it is proposed a sealing plug for a panel opening, the plug comprises a head portion having a first diameter larger than of the panel opening. Furthermore, the plug comprises a leg portion concentric to the head portion and having a second diameter shorter than the first diameter.

The leg portion comprises at least two latches extending radially towards the head portion. Each latch comprises a base contacting the leg and a first half and a second half divided by an imaginary plane defined by the axis of the plug and a center of the base. The first half is larger than the second half to achieve a decrease in the insertion force of the plug. Each latch is resiliently deformable about an axis defined by the base of each latch.

To achieve the sealing function of the plug, the passing of the leg portion and the at least two latches through the panel opening causes resilient deformation of each latch, such that each latch deforms and recovers thereby causing the panel to be retained by the at least two latches and between the at least two latches and the head portion of the plug.

In some examples, the leg can comprise three or four latches.

In some examples, the first half and the second half of the latch form a kaplan-helix shape. In this respect, a simple way to reduce the insertion force is making "kaplan-helix" shape with the first and second halves. Furthermore, this shape increases the guiding of the sealing plug on the panel opening.

In some other examples, the first half and the second half of the latch form a concave shape or a convex shape. In some other examples, the first half and the second half form a convex shape with a cleft. In some other examples, the first half and the second half form a triangular shape.

In some examples, each latch can comprise, or consist of, a thermoplastic elastomeric material.

In some other examples, the sealing plug can comprise, or consist of, a thermoplastic elastomeric material.

In some examples, the thermoplastic elastomeric material has a Shore D hardness in the range of 30 to 60. Preferably, in some examples, the thermoplastic elastomeric material has a Shore D hardness in the range of 50 to 55, most preferably approximately 52.

In other examples, the thermoplastic elastomeric material has a Shore D hardness ranging from 30, 35, 40, 45, 50, or 55 to 35, 40, 45, 50, 55, or 60. Any combination of lower and upper limits is contemplated herein. The thermoplastic elastomeric material may have a Shore D hardness of approximately 30, 35, 40, 45, 50, 55, or 60.

In some examples, each latch may include a wall having a thickness of approximately 0.5 mm to approximately 1.0 mm, preferably approximately 0.7 mm.

BRIEF DESCRIPTION OF THE DRAWINGS

For a better understanding the above explanation and for the sole purpose of providing an example, some non-limiting drawings are included that schematically depict a practical embodiment.

DESCRIPTION OF PREFERRED EMBODIMENTS

Figure 1A:
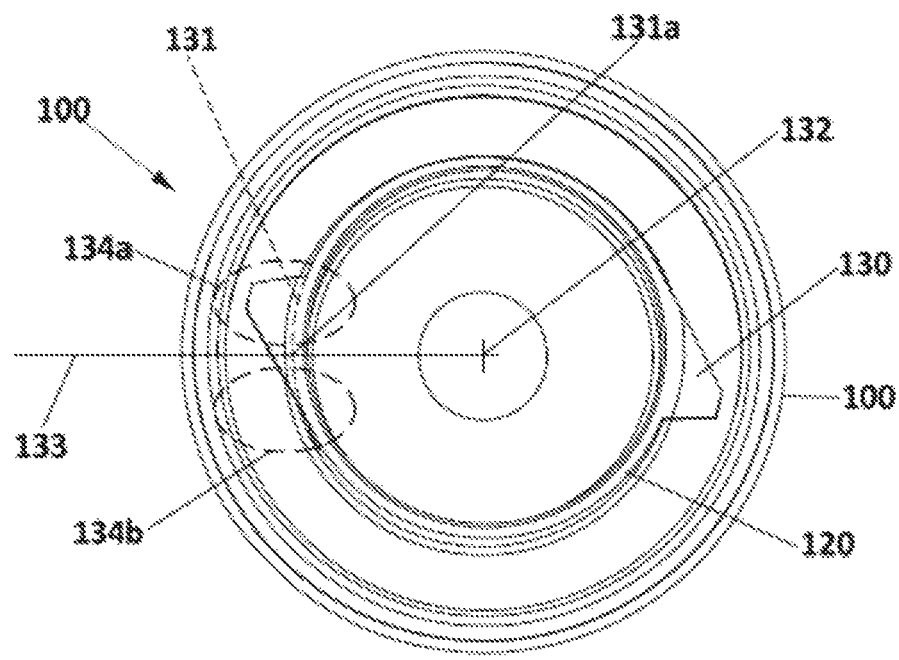
FIGS. 1A and 1B show two views of a first example of a sealing plug according to the present invention.
Figure 1B:
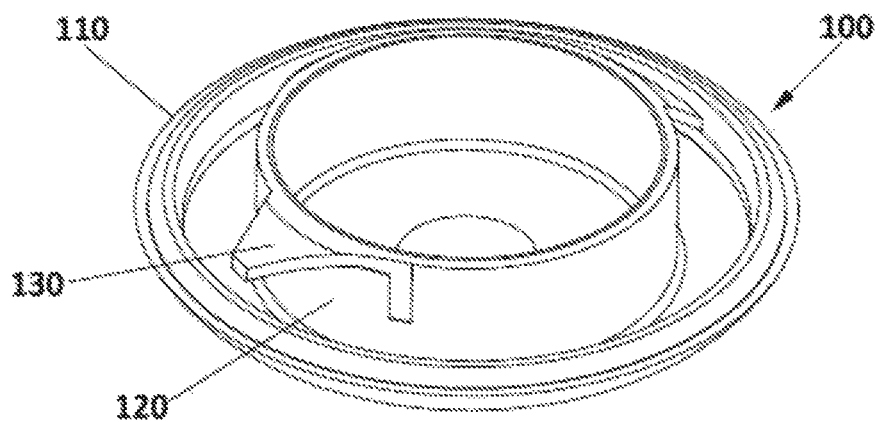

FIGS. 1A and 1B show two views of a first example of a sealing plug (100) according to the present invention. The sealing plug (100) comprises a head portion (110), a leg (120) and two latches (130) extending radially towards the head portion (110).

Each latch (130) comprises a base (131) shown in the figure in discontinuous line and wherein the base (131) is contacting the leg (120). The base (131) comprises a center (131*a*). Furthermore, each latch (130) can be comprised by a first half (134*a*) and a second half (134*b*). The first half (134*a*) and the second half (134*b*) can be divided by an imaginary plane (133) defined by an axis (132) of the plug (100) and the center (131*a*) of the base (131). Based on this imaginary division of the latch (130), it can be appreciated that the first half (134*a*) is larger than the second half (134*b*). The fact that the first half (134*a*) is larger than the second half (134*b*). Different latch shapes can be considered and hence, different first and second halves may be formed based on the condition that one half (e.g. the first half (134*a*)) is larger than the other (e.g. second half (134*b*)).

FIG. 1B shows a second view of the sealing plug (100) comprising the head portion (110), the leg (120) and two latches (130) extending radially towards the head portion (110).

Figure 2:
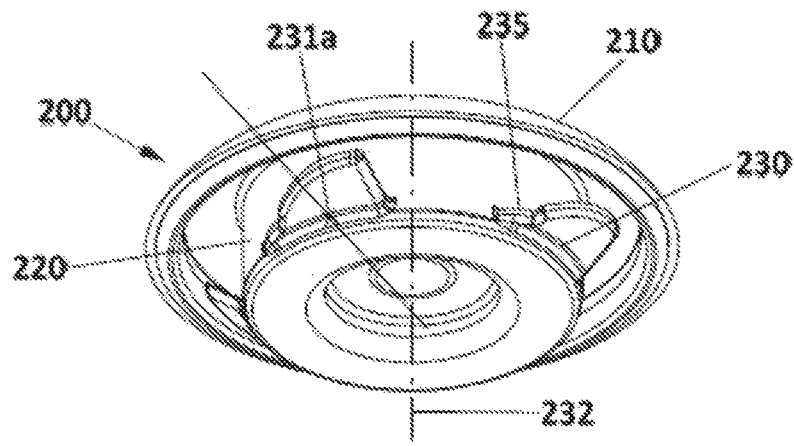
FIG. 2 shows a view of a second example of a sealing plug according to the present invention.

FIG. 2 is a view of a second example of a sealing plug (200) according to the present invention. The sealing plug (200) comprises a head portion (210), a leg (220) and four latches (230) extending radially towards the head portion (110). In the figure, only three latches (230) are shown. The four latches (230) comprise first and second halves that form a convex shape with a cleft (235). Again, a first half is larger than a second half based on an imaginary plane defined by an axis (232) of the plug (200) and a center (231a) of the base (231).

Figure 3:
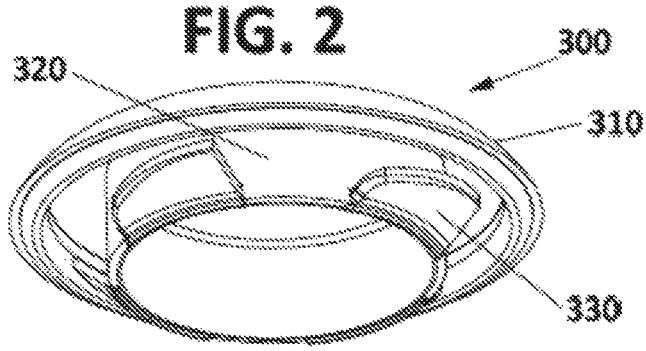
FIG. 3 shows a view of a third example of a sealing plug according to the present invention.

FIG. 3 shows a view of a third example of a sealing plug according to the present invention. The sealing plug (300) comprises a head portion (310), a leg (320) and four latches (330) extending radially towards the head portion (310). The four latches (230) comprise first and second halves that form a kaplan-helix shape.

Figure 4:
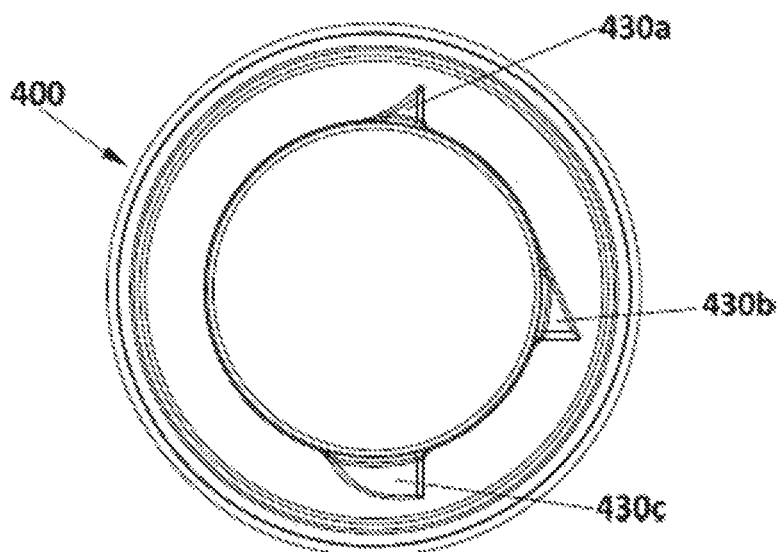
FIG. 4 shows different examples of latches according to the present invention.

FIG. 4 shows different examples of latches (430a, 430b, 430c) according to the present invention. A first example of a latch (430a) comprises first and second halves that form a concave shape. A second example of a latch (430b) comprises first and second halves that form a triangular shape. A third example of a latch (430c) comprises first and second halves that form a convex shape.

As best shown in FIGS. 1B, 2, and 3, each latch (130, 230, 330, 430) of each respective plug (100, 200, 300, 400) includes a wall extending from the respective base (131, 231) of the latch (130, 230, 330, 430). In the depicted embodiments, the wall has a thickness of approximately 0.7 mm.

With further reference to FIGS. 1 to 4, one or more latches (130, 230, 330, 430a, 430b, 430c) as described herein comprises a thermoplastic elastomer, thereby enabling each latch (130, 230, 330, 430a, 430b, 430c) to flex, in use. In some embodiments, the sealing plug (100, 200, 300, 400), including their respective latches, comprises a thermoplastic elastomer. Thus, each latch (130, 230, 330, 430a, 430b, 430c) is flexible, or can otherwise bend or resiliently deform, about an axis defined by the base (131, 231). In the depicted embodiments, the thermoplastic elastomer has a Shore D hardness of approximately 52.

In other words, each latch (130, 230, 330, 430a, 430b, 430c) is configured to bend radially, that is perpendicularly to a central axis (see FIGS. 2-232) of the plug (100, 200, 300, 400), for example, about a rotation axis defined by the base (131, 231) between each latch (130, 230, 330, 430a, 430b, 430c) and the leg (120, 220, 320). In this way, each latch (130, 230, 330, 430a, 430b, 430c) can flex during insertion and then snap-back to retain a panel between the latches (130, 230, 330, 430a, 430b, 430c) and the head portion (110, 210, 310) of the sealing plug (100, 200, 300, 400), as described in further detail in relation to FIGS. 5A to 5D. Such a feature contributes to the reduction in the insertion force of the sealing plug (100, 200, 300, 400).

Figure 5A:
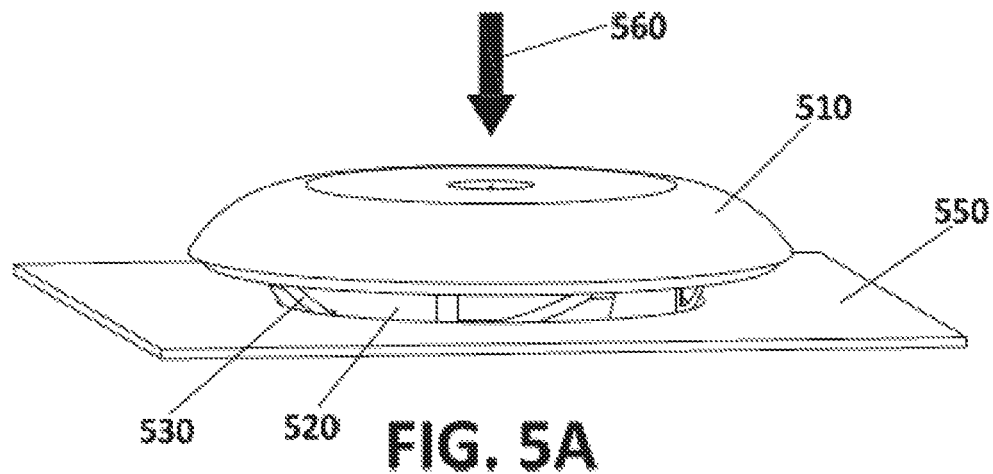
FIGS. 5A to 5D show the insertion of an example of a sealing plug according to the present disclosure into a panel opening.

FIGS. 5A to 5D show the insertion of a sealing plug (500) according to the present disclosure into an opening of a panel (550). The sealing plug (500) comprises a head portion (510), a leg (520) and four latches (530) extending radially towards the head portion (510). The insertion of the plug (500) into the vehicle panel (550) is shown in FIG. 5A. The four latches (530) permit achieving a reduction of the insertion force (560) during plug insertion into the panel (550) as the latches shape meet the two halves condition previously described in the present disclosure.

Figure 5B:
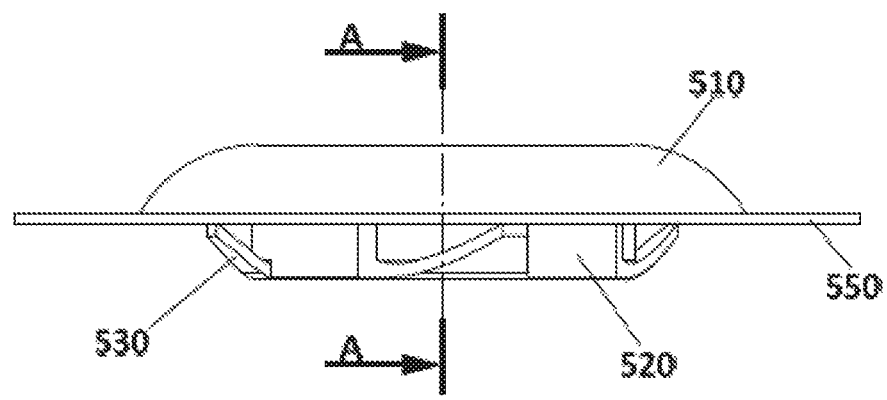
Figure 5C:
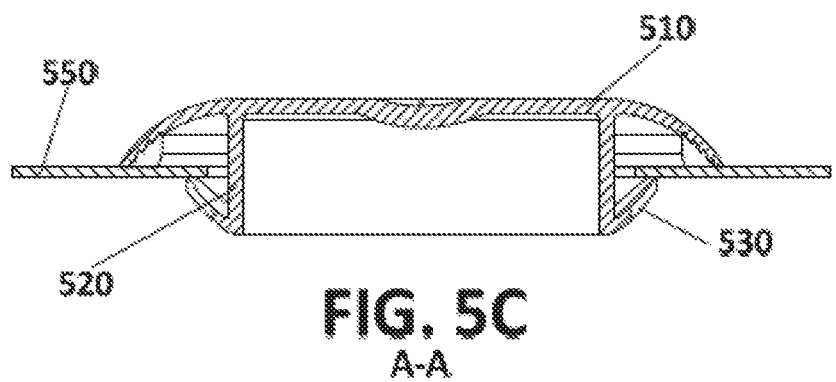
Figure 5D:
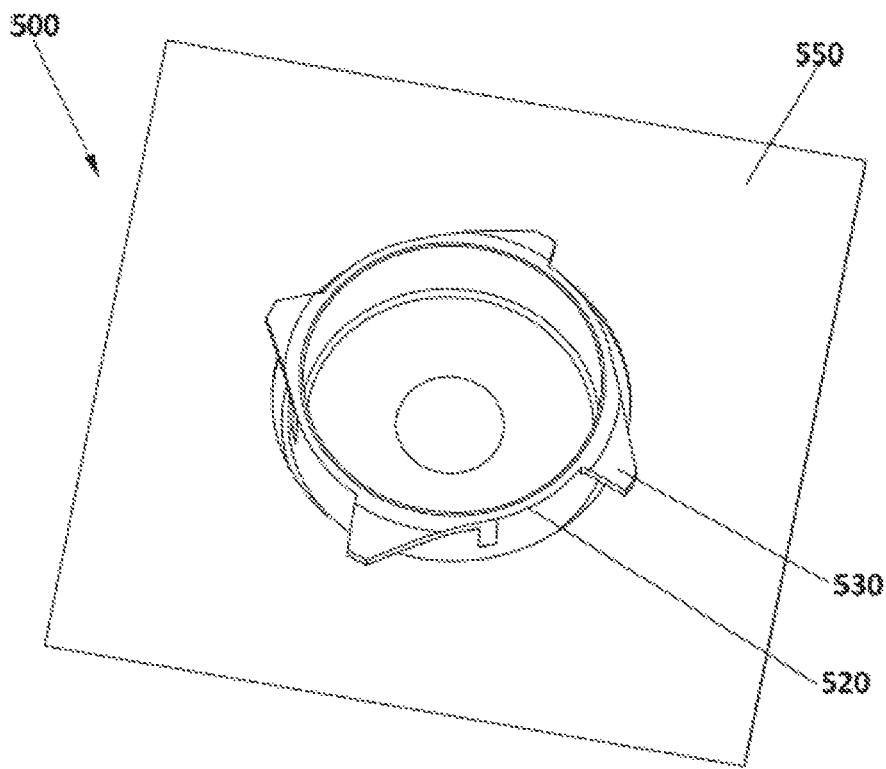

It can be appreciated in FIG. 5B and the section A of the plug (500) shown in FIG. 5C that the passing of the leg portion (520) and the four latches (530) through the panel opening causes the panel (550) to be retained by the four latches (530) and between the four latches (530) and the head portion (510) of the plug (500). FIG. 5D shows a rear view of the plug (550) retained by the four latches (530) and between the four latches (530) and the head portion (510) of the plug (500) achieving the sealing function.

The sealing plug (500) shown in FIGS. 5A to 5D may, as described above in relation to FIGS. 1 to 4, comprise one or more latches (530) having a wall extending from the respective base of the latch (530). Furthermore, the sealing plug (500), as described above, may comprise one or more latches (530) comprising a thermoplastic elastomeric material, thereby enabling each latch (530) to flex, in use. In some embodiments, the sealing plug (500), including each latch (530), comprises a thermoplastic elastomeric material. Thus, each latch (530) is flexible, or can otherwise bend or resiliently deform, about an axis defined by the base, as described in relation to FIGS. 1 and 2. In the depicted embodiments, the thermoplastic elastomer has a Shore D hardness of approximately 52.

In other words, each latch (530) is configured to bend radially, that is perpendicularly to a central axis (see FIGS. 2-232) of the plug (500), for example, about a rotation axis defined by the base (see FIGS. 1 and 2) between each latch (530) and the leg (520). In this way, each latch (530) can flex during insertion and then snap-back to retain the panel (550) between the latches (530) and the head portion (510) of the sealing plug (500). Such a feature contributes to the reduction in the insertion force of the sealing plug (100, 200, 300, 400).

Even though reference has been made to a specific embodiment of the invention, it is obvious for a person skilled in the art that the sealing plugs described herein are susceptible to numerous variations and modifications, and that all the details mentioned can be substituted for other technically equivalent ones without departing from the scope of protection defined by the attached claims.

Certain implementations are described in the following numbered clauses:

1. A sealing plug (100) for a panel opening, the plug having an axis (132) and comprising:
   a head portion (110) having a first diameter larger than of the panel opening; and
   a leg portion (120) concentric to the head portion (110) and having a second diameter shorter than the first diameter, the plug characterized in that:
   the leg comprises at least two latches (130) extending radially towards the head portion (110),
   wherein each latch comprises a base (131) contacting the leg and a first half (134a) and a second half (134b) divided by an imaginary plane (133) defined by the axis (132) of the plug (100) and a center (131a) of the base (131), wherein the first half (134a) is larger than the second half (134b), and
   wherein the passing of the leg portion (120) and the at least two latches (130) through the panel opening causes the panel to be retained by the at least two latches (130) and between the at least two latches (130) and the head portion (110) of the plug (100).

2. The plug according to clause 1, wherein the leg portion (120) comprises three latches (130), and preferably four latches (130).

3. The plug according to clauses 1 or 2, wherein the first half (134a) and the second half (134b) form a klapan-helix shape.

4. The plug according to clauses 1 or 2, wherein the first half (134a) and the second half (134b) form a concave shape.

5. The plug according to clauses 1 or 2, wherein the first half (134a) and the second half (134b) form a convex shape.

6. The plug according to clauses 1 or 2, wherein the first half (134a) and the second half (134b) form a convex shape with a cleft.

7. The plug according to clauses 1 or 2, wherein the first half (134a) and the second half (134b) form a triangular shape.

8. The plug according to any preceding clause, wherein each latch (130) comprises a thermoplastic elastomeric material.

9. The plug according to any one of clauses 1 to 7, wherein the plug (100) comprises a thermoplastic elastomeric material.

10. The plug according to clause 8 or 9, wherein the thermoplastic elastomeric material has a Shore D hardness of 30 to 60.

11. The plug according to clause 10, wherein the thermoplastic elastomeric material has a Shore D hardness of 50 to 55.

12. The plug according to any preceding clause, wherein each latch (130) is resiliently deformable about an axis defined by the base (131) of each latch (130).

13. The plug according to clause 12, wherein each latch (130) is resiliently deformable such that the passing of the leg portion (120) and the at least two latches (130) through the panel opening causes resilient deformation of each latch (130), such that each latch (130) deforms and recovers thereby causing the panel to be retained by the at least two latches (130) and between the at least two latches (130) and the head portion (110) of the plug (100).

14. The plug according to any preceding clause, wherein each latch (130) comprises a wall extending from the respective base (131) of the latch, the wall having a thickness of approximately 0.5 mm to approximately 1.0 mm, preferably approximately 0.7 mm.

The invention claimed is:

1. A sealing plug for a circular panel opening, the plug having a central axis and comprising:
    a head portion having a first diameter larger than of the circular panel opening; and
    a leg portion concentric to the head portion and having a second diameter shorter than the first diameter wherein:
    the leg portion comprises at least two latches extending radially towards the head portion,
    wherein each latch comprises a base contacting the leg portion and a first half and a second half divided by an imaginary plane defined by the central axis of the plug and a center of the base, wherein the first half is larger than the second half,
    wherein each latch is resiliently deformable about a rotation axis defined by the base between each latch and the leg portion,
    wherein a passing of the leg portion and the at least two latches through the circular panel opening causes resilient radial deformation of each latch about the rotation axis defined by the base of each latch, perpendicularly to the central axis of the plug, such that each latch deforms and recovers thereby causing the panel to be retained by the at least two latches and between the at least two latches and the head portion of the plug.

2. The plug according to claim 1, wherein the leg portion comprises three or more latches.

3. The plug according to claim 1, wherein the first half and the second half form a klapan-helix shape.

4. The plug according to claim 1, wherein the first half and the second half form a concave shape.

5. The plug according to claim 1, wherein the first half and the second half form a convex shape.

6. The plug according to claim 1, wherein the first half and the second half form a convex shape with a cleft.

7. The plug according to claim 1, wherein the first half and the second half form a triangular shape.

8. The plug according to claim 1, wherein each latch comprises a thermoplastic elastomeric material.

9. The plug according to claim 1, wherein the plug comprises a thermoplastic elastomeric material.

10. The plug according to claim 9, wherein the thermoplastic elastomeric material has a Shore D hardness of 30 to 60.

11. The plug according to claim 10, wherein the thermoplastic elastomeric material has a Shore D hardness of 50 to 55.

12. The plug according to claim 1, wherein each latch comprises a wall extending from the respective base of the latch, said wall having a thickness of 0.5 mm to 1.0 mm.

13. A sealing plug for a circular panel opening, the sealing plug having a central axis and comprising:
    a head portion having a first diameter larger than of the circular panel opening; and
    a leg portion concentric to the head portion and having a second diameter smaller than the first diameter;
    wherein the leg comprises at least two latches extending radially towards the head portion;
    wherein each latch comprises a base contacting the leg and a first half and a second half divided by an imaginary plane that runs through the central axis of the plug and a center of the base, wherein the first half is larger than the second half, wherein each latch includes an outer end edge that is axially spaced from a panel contacting part of the head portion;
    wherein each latch is resiliently deformable about a rotation axis defined by the base of each latch where the base joins the leg portion; and
    wherein passing of the leg portion and the at least two latches through the circular panel opening causes resilient radial deformation of each latch about the rotation axis defined by the base of each latch, perpendicularly to the central axis of the plug, such that each latch deforms and recovers thereby causing the panel to be retained by the at least two latches and between the outer end edge of each of the at least two latches and the panel contacting part of the head portion of the plug.

* * * * *